(12) United States Patent
Koning et al.

(10) Patent No.: US 7,367,590 B2
(45) Date of Patent: May 6, 2008

(54) SEAT BELT ASSEMBLY AND METHOD OF INSTALLATION

(75) Inventors: Richard W. Koning, Yale, MI (US); Lawrence M. Refior, Romeo, MI (US); Ravinder Mann, Sterling Heights, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 11/457,072

(22) Filed: Jul. 12, 2006

(65) Prior Publication Data

US 2007/0029773 A1 Feb. 8, 2007

Related U.S. Application Data

(60) Provisional application No. 60/705,562, filed on Aug. 4, 2005.

(51) Int. Cl.
*B60R 22/20* (2006.01)
(52) U.S. Cl. .................................................. 280/801.2
(58) Field of Classification Search ............. 280/801.2, 280/804, 808; 297/468, 473, 483
See application file for complete search history.

(56) References Cited

U.S. PATENT DOCUMENTS

| 4,470,618 | A | * | 9/1984 | Ono | 280/801.2 |
| 4,552,408 | A | * | 11/1985 | Ono | 297/483 |
| 4,682,790 | A | | 7/1987 | Katsuno et al. | |
| 4,861,071 | A | * | 8/1989 | Takada | 280/801.2 |
| 4,871,192 | A | | 10/1989 | Escaravage et al. | |
| 4,982,981 | A | | 1/1991 | Fourrey et al. | |
| 5,050,907 | A | | 9/1991 | Boumarafi et al. | |
| 5,732,974 | A | * | 3/1998 | Sayles | 280/805 |
| 5,769,456 | A | | 6/1998 | Juchem et al. | |
| 6,715,793 | B2 | * | 4/2004 | Okubo | 280/808 |
| 6,733,041 | B2 | * | 5/2004 | Arnold et al. | 280/801.2 |
| 6,802,537 | B1 | * | 10/2004 | Tolfsen et al. | 280/801.2 |
| 2002/0011749 | A1 | | 1/2002 | Janz | |
| 2007/0013185 | A1 | * | 1/2007 | Desmarais et al. | 280/801.2 |

FOREIGN PATENT DOCUMENTS

EP 0 639 485 A 7/1995

* cited by examiner

*Primary Examiner*—Paul N. Dickson
*Assistant Examiner*—Robert A. Coker
(74) *Attorney, Agent, or Firm*—Markell Seitzman

(57) ABSTRACT

A method of installing a seat belt system (100) into a passenger compartment of a vehicle, the system of the type including a seat belt retractor (501), a height adjuster (102) and a web guide (104), the method including the steps of: a) providing a height adjusting mechanism having a bar or track and a carrier; b) securing the web guide to the carrier so the height adjuster and web guide form a subassembly; c) locating and securing the retractor to a desired location within the vehicle and; d) lifting the subassembly and manipulating the height adjuster to a desired location in the vehicle and securing the height adjuster to the desired location, wherein the step of lifting the subassembly simultaneously locates the web guide to its desired location.

7 Claims, 6 Drawing Sheets

SEAT BELT ASSEMBLY AND METHOD OF INSTALLATION

This application claims the benefit of U.S. Provisional Application 60/705,562, filed on Aug. 4, 2005. The disclosure of the above application is incorporated herein by reference.

BACKGROUND AND SUMMARY OF THE INVENTION

The present invention generally relates to a height-adjusting mechanism for a D-ring (also called a web guide) of a seat belt system.

Reference is made to FIG. 5, which shows a portion of a passenger compartment 600 of a typical automotive vehicle 602. The front and rear doors and windows 604 and 606 are shown diagrammatically with a B-pillar 610 therebetween. FIG. 5 also shows the components of a typical three-point seat belt system generally identified by numeral 500. This system 500 includes a seat belt retractor 501, a length of seat belt webbing (belt) 502, a tongue 504, which is slidingly received on the seat belt webbing, and which divides the seat belt webbing into a shoulder belt portion 506 and a lap belt portion 508. The lap belt portion 508 is secured via a first anchor 510 to the vehicle floor or other structural component of the vehicle. The shoulder belt portion slidably receives a web guide (D-ring) 512 that typically has a support surface over which the shoulder belt slides. Web guides and D-rings are used interchangeably. U.S. Pat. No. 5,601,311 is illustrative of a simple web guide and is incorporated herein by reference.

It is now commonplace to mount the web guide on a vertically adjustable mechanism, which is typically called a height adjuster 550. U.S. Pat. Nos. 5,050,907 and 5,230,534 are illustrative of this type of adjustable mechanism and are incorporated herein by reference. The system 500 further includes a seat belt buckle 520 that is secured to the vehicle floor or seat frame 534. The height adjuster 550 will most usually include a rail or track 552 that is secured to the upper regions of the B-pillar by one or more fasteners. The height adjuster 550 further includes a carrier 554 that is slidably received on the track or rail 552. The rail, track and carrier can take many forms. The carrier 554 will include a threaded bore to receive a shoulder bolt 556 that is used to secure the D-ring 512 to the carrier. Historically these tracks have been secured to the B-pillar by two threaded fasteners inserted within corresponding openings 551 within the track or rail. Alternatively, the lower portion of the track or rail can be formed as a hook that is received through an opening within the B-pillar, thereby securing the lower end of the track. With this design the upper end of the track is secured by a single threaded fastener. In FIG. 5, the vehicle seat is identified by numeral 530. For the purpose of illustration, the seat 530 has been moved rearward, see arrow 532, from its normal installed position and from the B-pillar 610 of the vehicle.

The manufacturer of the seat belt system 500 will supply the system to the automotive assembly factory in three parts: the height adjuster 550, the buckle 520 and a subassembly 560 comprising the retractor, seat belt, tongue, D-ring, and anchors.

The installation of the seat belt system into the vehicle is relatively straightforward. The track/rail 552 is moved in the direction of arrow 570 to the B-pillar 610 and secured by the required number of fasteners. The buckle 520 is secured by a fastener such as 522 to its mounting surface (the vehicle floor or seat belt frame). Subsequently, the retractor 501 is secured typically by one bolt to a lower portion of the B-pillar. Thereafter, the web guide (D-ring) 512 is lifted (see arrow 572) toward the previously mounted carrier 554 and aligned to the carrier 554. With the D-ring in place, the installer obtains shoulder bolt 556 and twists the shoulder bolt into the threaded bore.

In a production line environment in which the vehicle may be moving down the assembly line, it is difficult to hold the D-ring in place and maintain the alignment of the D-ring to the carrier and then insert the shoulder bolt 556 while holding the D-ring in place. Additionally, the shoulder bolt can be dropped or misplaced, adding valuable time and cost to the assembly process. Further, the assembler must hold the D-ring in one hand, insert and thread the shoulder bolt with another hand and then, once the shoulder bolt is partially threaded to the carrier, locate, lift and use a power screwdriver to complete the installation. As can be appreciated, each of the installation steps takes time, and under certain situations some of these installation steps have to be repeated, as these steps may not have been done properly during the first instance.

It is an object of the present invention to provide an improved height adjusting assembly for a seat belt as well as an improved method of assembly.

Accordingly the invention comprises: a seat belt system as well as a method of installing the seat belt system into a passenger compartment of a vehicle, the system of the type including a seat belt retractor, a height adjuster and a web guide, the method including the steps of: a) providing a height adjusting mechanism having a bar or track and a carrier; b) securing a web guide to the carrier so the height adjuster and web guide form a subassembly; c) locating and securing the retractor to a desired location within the vehicle and; d) lifting the subassembly and manipulating the height adjuster to a desired location in the vehicle and securing the height adjuster to the desired location, where the step of lifting the subassembly simultaneously locates the web guide to its desired location.

Many other objects and purposes of the invention will be clear from the following detailed description of the drawings.

DETAILED DESCRIPTION OF THE INVENTION

Figure 1:
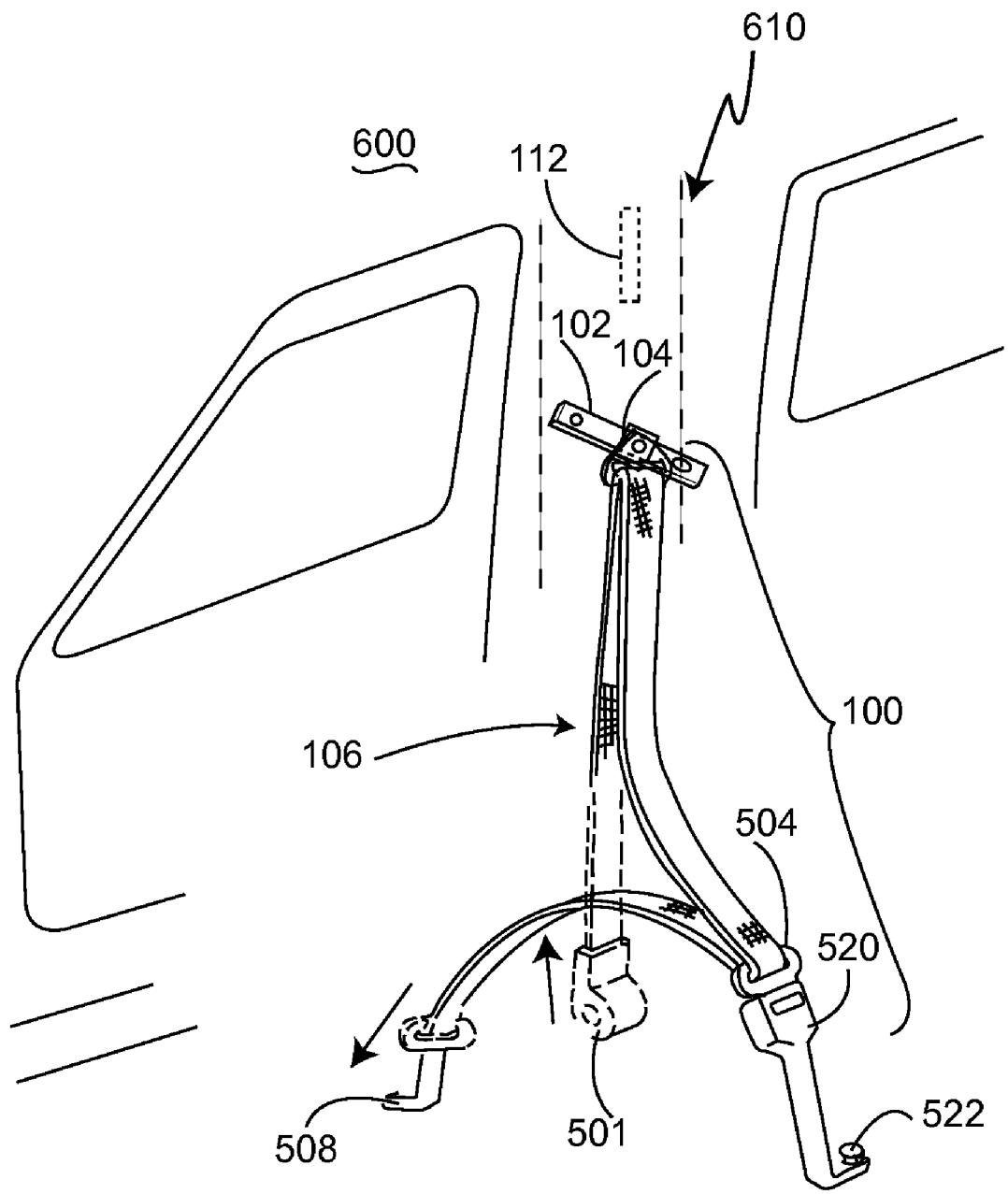
FIG. 1 illustrates a passenger compartment of a vehicle and shows a three-point seat belt system of the present invention.
Figure 2:
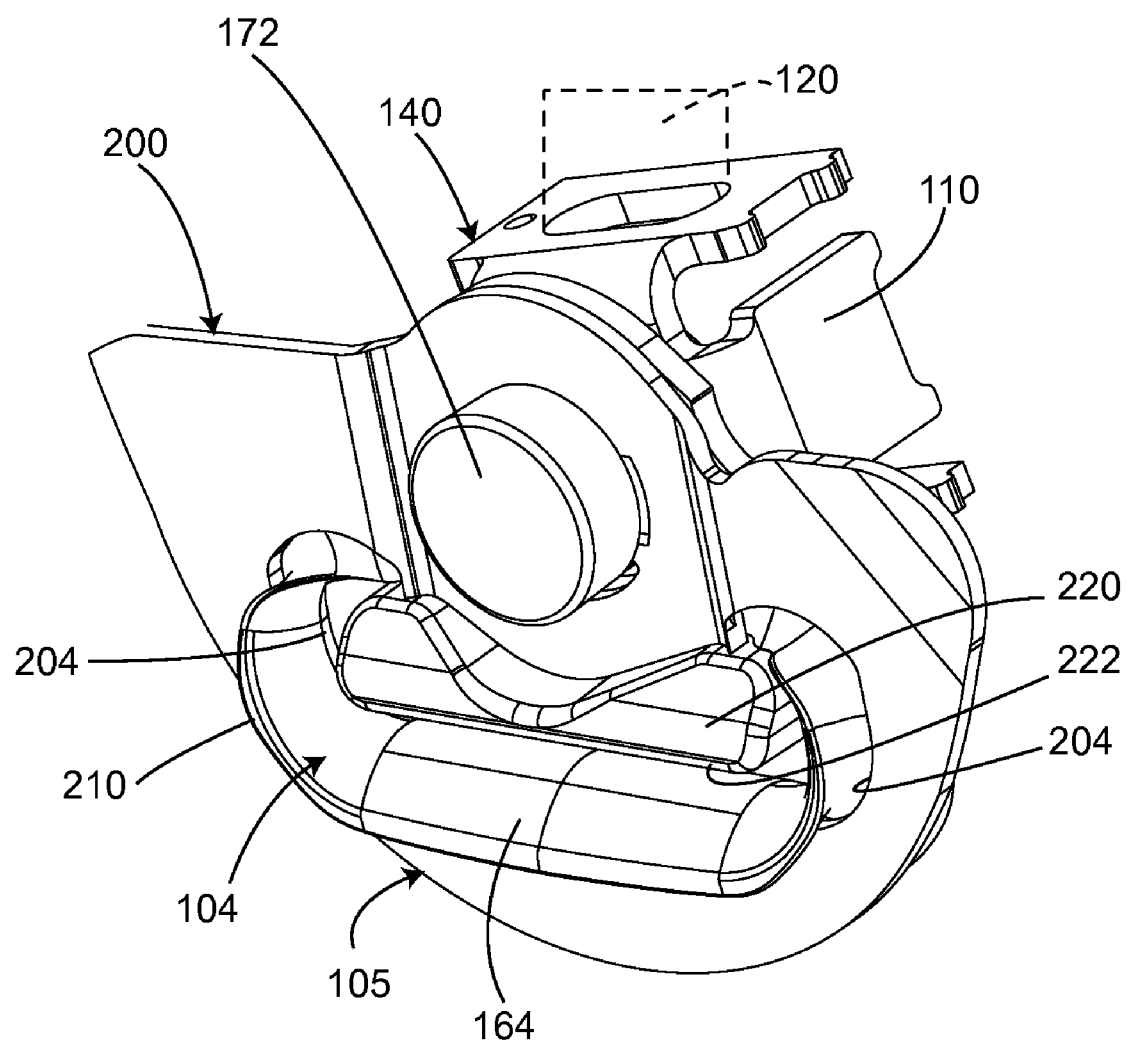
FIG. 2 illustrates a D-ring fixedly secured to a carrier of a height adjuster.
Figure 3:
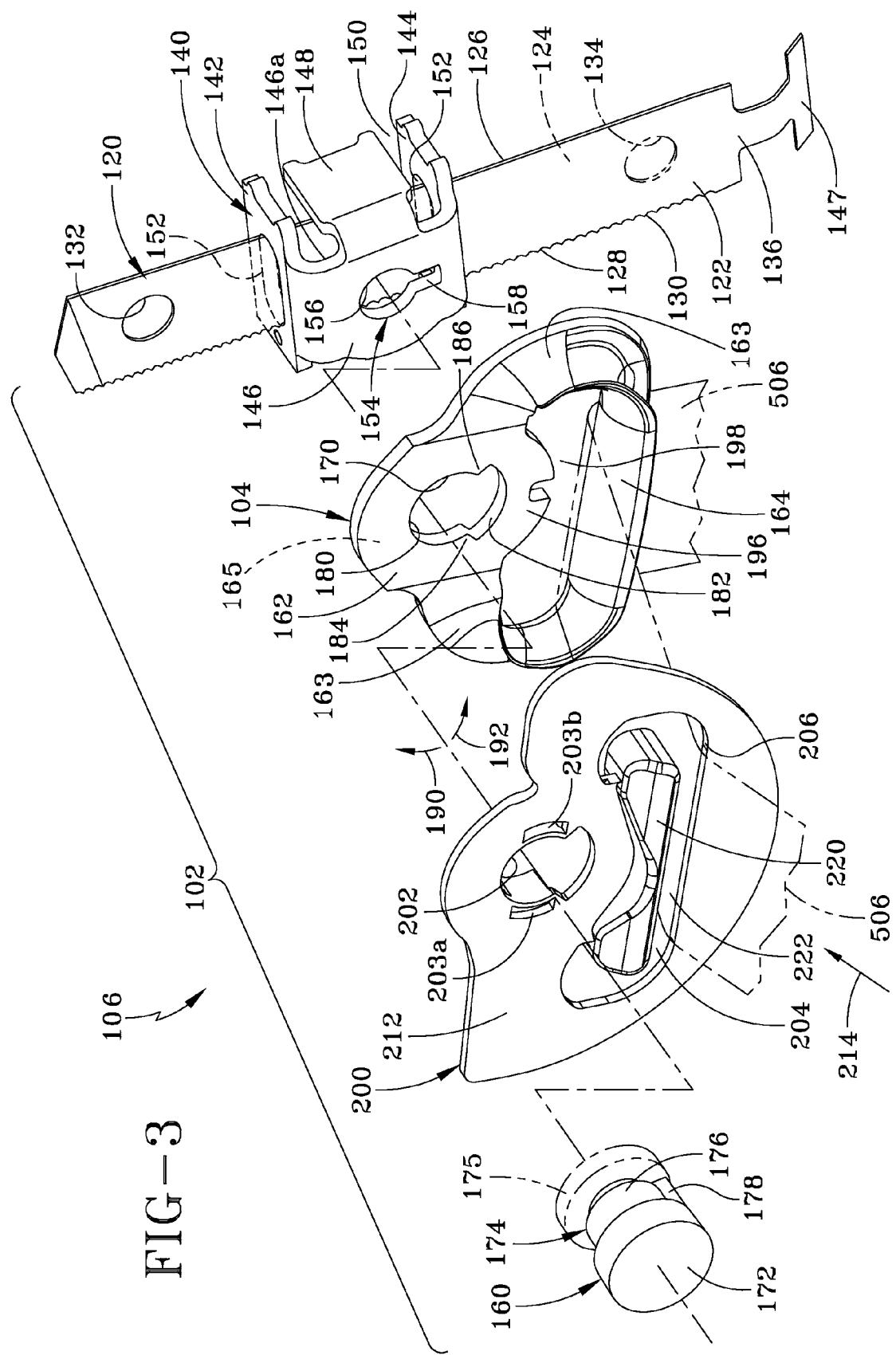
FIG. 3 is an exploded view of the D-ring and carrier shown in FIG. 2.

Reference is made to FIGS. 1, 2 and 3, which illustrate features of the present invention. FIG. 1 illustrates a three-point seat belt system 100 of the present invention. This system 100 has many of the components used in the prior art. Additionally, height adjuster 102 and D-ring 104 are secured together during initial assembly and encompass part of a subassembly 106. FIGS. 2 and 3 illustrate in greater detail the connection of the D-ring 104 and the carrier 140 of height adjuster 102.

As will be seen, the integration of the D-ring with the height adjuster 102, prior to assembly in the vehicle, provides a more efficient method of assembling the three-point seat belt system to the vehicle. In the present invention there is no need for the assembler to laboriously and inefficiently secure the D-ring to the carrier of the height adjuster on the vehicle assembly line, as this step is accomplished during the manufacture of the subassembly 106, thereby saving time, lowering the cost of the vehicle, making the assembly process less taxing, less stressful and easier for the assembler, and increasing the efficiency of the installation process in the vehicle assembly facility. In the vehicle assembly facility, after securing the seat belt retractor 501 to the B-pillar 610, the installer grabs the height adjuster 102, moves same into the desired installation location on the B-pillar (such desired installation location being shown by phantom lines 112) and proceeds to install the height adjuster in the manner shown in the prior art. The lifting of the height adjuster 102 carries with it the web guide 104, as these parts, as mentioned, comprise a subassembly 106. As can further be appreciated, the present invention eliminates a number of assembly steps found in the prior art. Also, the present invention includes some assembly steps found in a prior art installation, for example the anchor 510 and buckle 520 are appropriately still secured to the vehicle using known techniques.

Reference is now made to FIG. 2 as well as to FIG. 3, which illustrates in greater detail the major elements of the height adjuster 102 (which now includes D-ring 104), which is part of the subassembly 106. Height adjuster 102 includes a bar 120 having a generally oblong cross-section. The bar 120 includes a front face 122, rear face 124, and sides 126 and 128. As illustrated, bar 120 may include a plurality of discrete teeth 130 along side 128. These teeth 130 are optional as locking will occur with or without the teeth (although the teeth are preferred). Bar 120 includes at least one mounting opening 132 through which a threaded bolt is used to secure the B-pillar 610. Another mounting opening 134 can be fabricated within the lower portions of the bar. As can be appreciated, an additional mounting fastener would be used in conjunction with opening 134. As illustrated, bar 120 includes a rearward bend, generally shown as 136, to form a hook 147 in the lower portion of bar 120. Hook 147 is received in a vertically oriented opening in the metal forming B-pillar 610. The bar 120 is then rotated 90° to its vertical orientation and then secured in place to the B-pillar.

Figure 4:
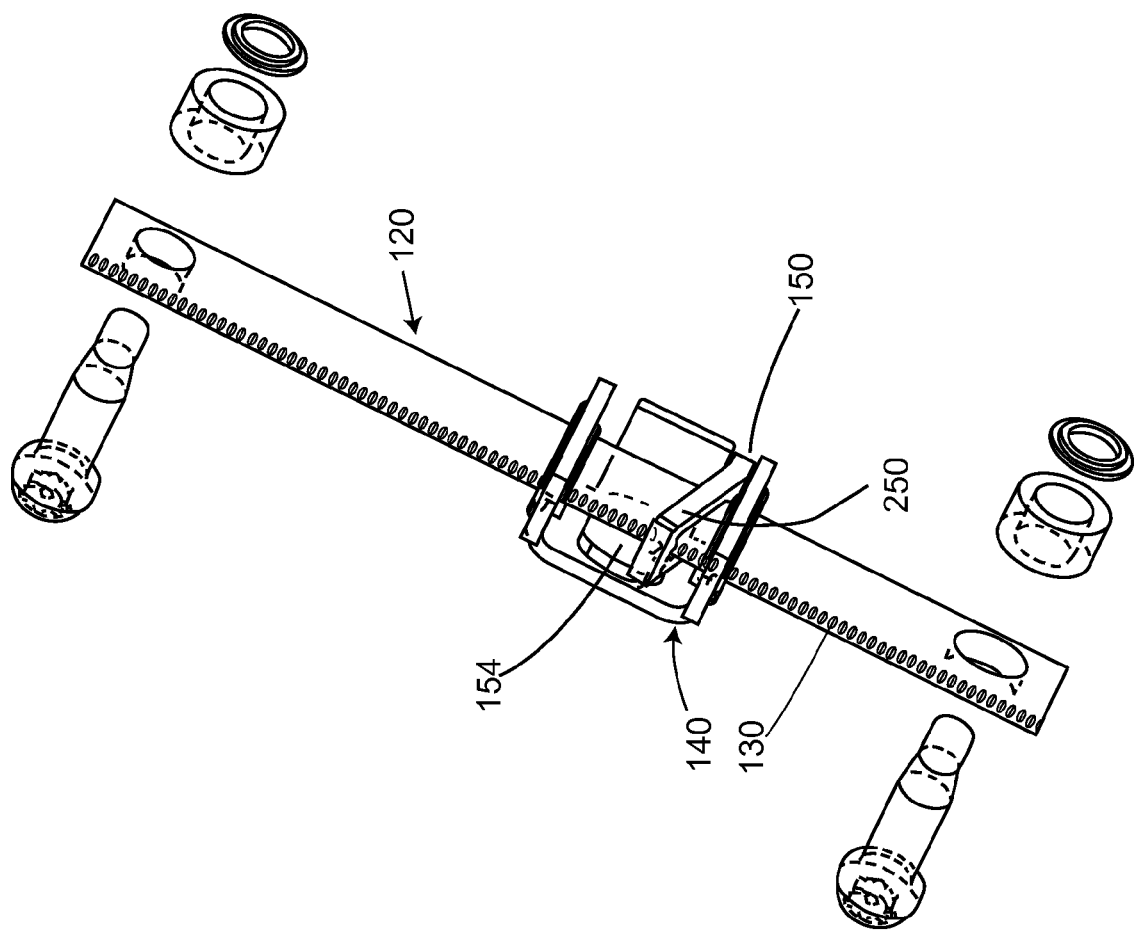
FIG. 4 shows a lock mechanism usable with the present invention.
Figure 5:
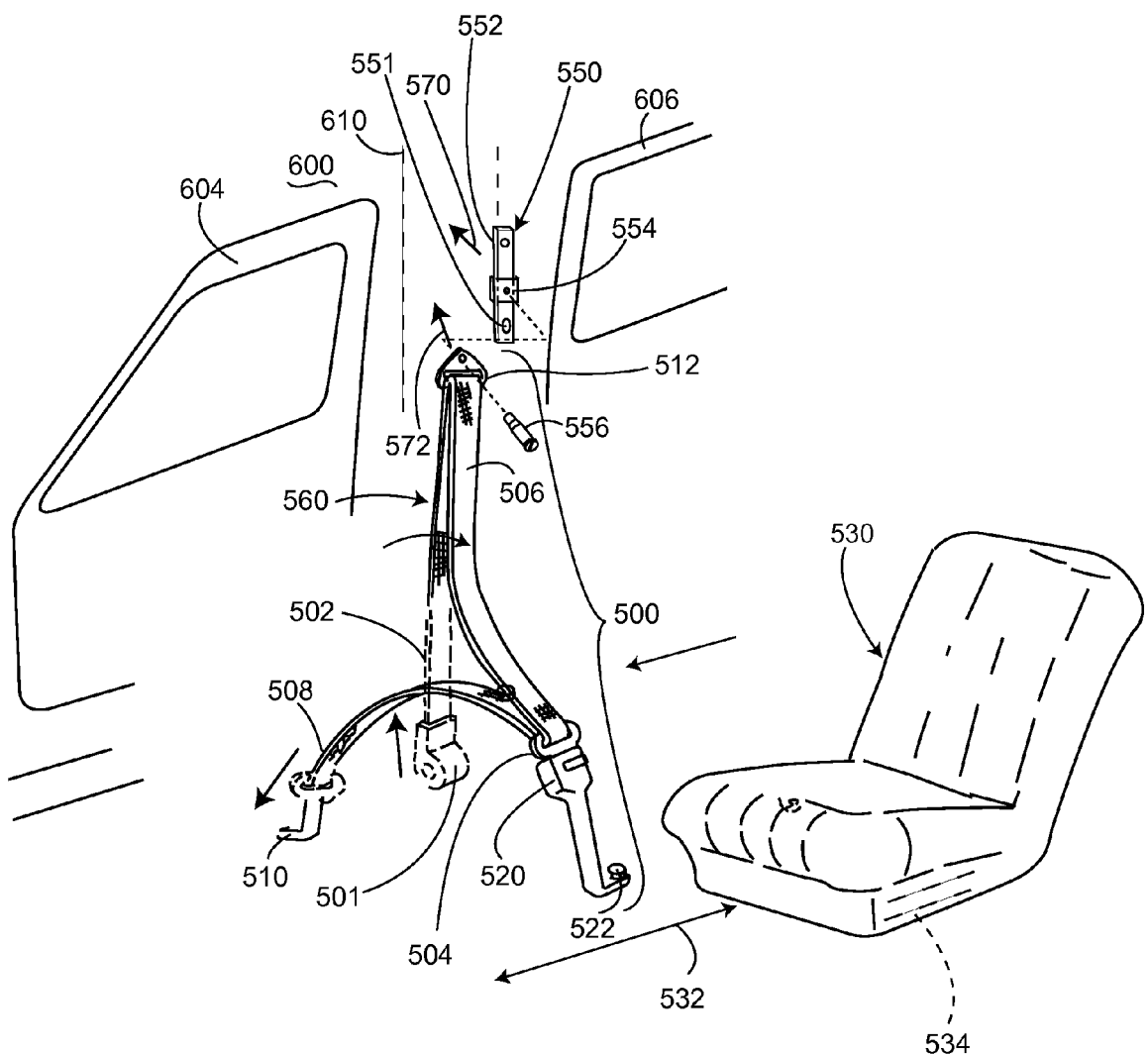
FIG. 5 shows a portion of a passenger compartment utilizing a three-point seat belt system.

Carrier 140 is slidably received upon the bar 120. The carrier 140 includes four sides: a top 142, a bottom 144, a front face 146 and a side 148. A portion of the locking mechanism 250 (shown in FIG. 4) is received in a space 150 between side 148 and bottom 144. Each of the top 142 and side 148 includes an oval opening 152 for receipt of bar 120. An oval bushing (not shown) can be inserted within each respective opening 152 primarily to reduce vibration between carrier 140 and bar 120. The front face 146 includes a keyed fastener opening 154 having a larger diameter portion 156 and a narrow diameter portion 158.

The D-ring 104 is secured to the carrier 140 by a rivet 160. The rivet 160 prevents the axial displacement of the D-ring and carrier while permitting the D-ring freedom to rotate through a limited range relative to the carrier 120. The D-ring 104 includes a weight bearing body 162, which includes an arcuately shaped seat belt supporting surface 164 formed in a U-shaped concave groove. The supporting surface may be smooth, include a number of grooves or projections which, depending on the mounting geometry of the D-ring in the vehicle, might be needed to laterally stabilize the seat belt on surface 164. As illustrated, D-ring 104 is formed as a one-piece metal stamping and may be appropriately coated to reduce friction with the woven seat belt. The D-ring body 162 includes an opening 170 for receipt of the rivet 160. That portion of the body 162 facing the front face 146 of the carrier generally about opening 170, as well as the rear of the opposing two depending sides 163, has a generally flat surface 165. This flat surface 165 facilitates rotation of the body 162 relative to the carrier. Further, the seat belt supporting surface 164 is formed as a forwardly extending lip with curved bottom and sides, which extend away from surface 165 (that is, which extend forwardly in FIG. 3).

Rivet 160 includes a head 172 and a shaft 174. The shaft 174 includes an upper portion 176 having a generally circular cross-section. Shaft 174 includes a rectangular lower section 178 positioned below the upper portion 176. The shaft 174 is sized to slidably fit within opening 154 of carrier 140. Subsequently, after the rivet 160 is located in the carrier 140, a rear rivet head 175 (shown in phantom line) is formed at the rear of shaft 174 after assembly, holding the rivet 160 to the carrier 140. The rear rivet head is located against an inner surface 146a of face 146 of carrier 140.

Reference is made to the D-ring shown in FIGS. 2 and 3. As mentioned, D-ring 104 includes opening 170. Opening 170 includes a first portion 180, which has a diameter slightly greater than the diameter of the upper portion 176 of rivet 160. The first portion 180 of the D-ring 104 rotates upon the upper portion 176 of the shaft of the rivet 160. Opening 170 includes a curved lower portion 182 having a diameter greater than the first portion 180. The lower portion 182 is configured as a sector of a larger diameter circle terminating in the shoulders or stops 184 and 186. The rotation of D-ring 104 in the direction of arrow 190 is limited to approximately 42 degrees whereupon shoulder 186 contacts one side of section 178 of rivet 160. Similarly, the rotation of the ring 104 in the direction of arrow 192 is limited to −42 degrees by the engagement of shoulder 184 with the opposing face of rivet section 178.

A lower portion 196, of the D-ring body 162, extends downwardly toward surface 164 and creates a narrow spacing 198 through which the shoulder belt 506 (shown in phantom line) extends. This narrow spacing can also be obtained through the use of a trim part 200.

Figure 3A:
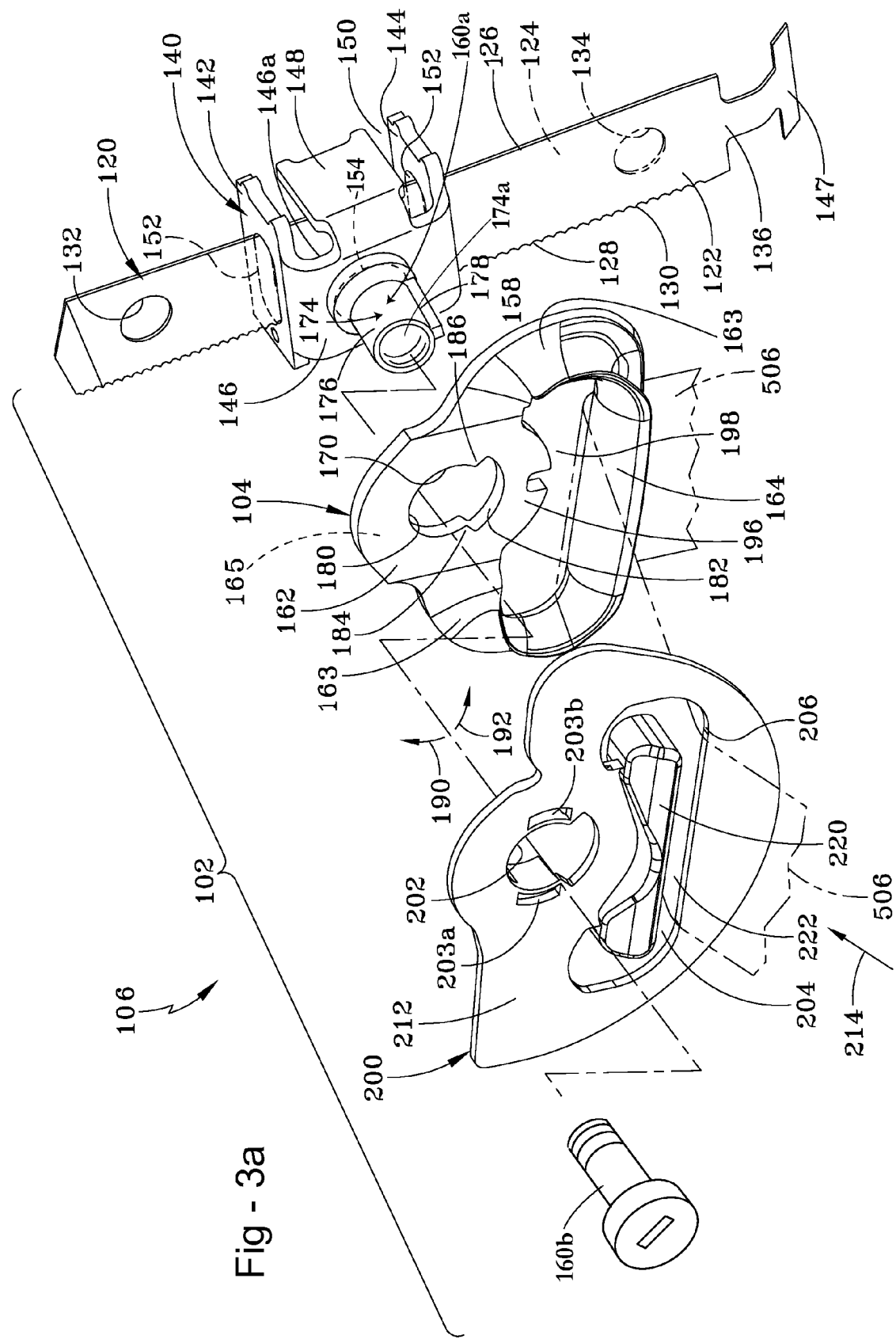
FIG. 3a is an exploded view showing an alternate embodiment of the present invention.

Reference is briefly made to the alternate embodiment of FIG. 3a. Those features of rivet 160 such as the shaft 174 and the projecting rivet section 178, which provide the functions of supporting the D-ring and providing the mechanism stop, have been transferred to the carrier 140. In this embodiment the shaft 174 is part of a rivet 160a inserted within a circular fastener opening 154 in the face 146 of the carrier and secured thereto. The D-ring body 162 rotates about the upper portions 176 of shaft 174. The D-ring (and trim part 200 discussed below) is secured to the carrier by a threaded bolt 160b inserted within a threaded bore 174a of the shaft 174.

In certain situations the D-ring is installed relative to a trim panel, and it may be desirable to attach a trim part 200 to the structural portions of the D-ring, which covers openings in the trim panel (which is for example secured to the B-pillar). The trim part 200 includes an opening 202. Tabs or pins 203a, b extend rearward of the trim part 200 and are secured to the D-ring body 162. The tabs or pins permit the trim part to rotate with the D-ring 104. Additionally, trim part 200 includes opening 204 below opening 202. A surface 206 of opening 202 is received behind a lip or groove 210 formed in the D-ring 104 behind surface 164 as shown in FIGS. 2 and 3. In addition, as can also be seen from FIGS. 2 and 3, the body 212 of trim part 200 is wider than the D-ring 104. When viewed in the direction of arrow 214 the trim part 200 covers the internal spaces and parts of the height adjuster and/or trim panel (not shown). The trim part 200 further includes a depending lobe 220, which creates a thin spacing 222, slightly greater than the thickness of the seat belt 506, through which the seat belt 506 slides. This lobe can also be formed in the D-ring.

As is known in the industry, a large trim part (not shown) known as "B-pillar trim" is fitted to the B-pillar 610. The B-pillar trim has provision to receive the D-ring 104 and a manual activation mechanism, which is used to release the lock mechanism of the height adjuster thereby permitting the D-ring and carrier to become repositioned along the rail 120.

Many changes and modifications in the above-described embodiment of the invention can, of course, be carried out without departing from the scope thereof. Accordingly, that scope is intended to be limited only by the scope of the appended claims.

The invention claimed is:

1. A seat belt system (100) for protecting a passenger of a vehicle, the system comprising:
   a seat belt retractor (501), a height adjusting mechanism (102) and a web guide (104), the height adjusting mechanism and web guide form part of a subassembly (106) configured to be mounted together to a mounting surface;
   the height adjusting mechanism including a carrier with a generally planar front surface (146) and wherein the web guide (104) includes a body (162) having a mounting opening (170), the mounting opening (170) including opposing shoulders or first stops (184, 186) for limiting rotation of the web guide, the carrier (140) including a fastener opening (154), the system including a fastener (160, 160a) mountable to the fastener opening (154), the web guide rotatable upon a portion of the fastener, the fastener including a mechanism stop (178) that interferes with the first stops (184, 186) to limit the rotation of the web guide.

2. The system according to claim 1 wherein the fastener opening is one of circular or keyed and wherein the fastener is one of a) a rivet secured to the carrier or b) a combination of a rivet, configured to receive a bolt therein, secured to the carrier and wherein the bolt is secured to the rivet.

3. The system according to claim 1 wherein the web guide includes a body (162) having a central body portion and depending sides, the central body portion and depending sides configured as a head and shoulders, the central body portion and depending sides generally adjacent the mounting opening, the web guide including a flat surface (165) facing an opposing surface of the carrier, the web guide further including an arcuate lip extending away from the opposing surface of the carrier and away from the flat surface, the arcuate lip forming a surface (164) for slidingly supporting a seat belt.

4. The system according to claim 1, wherein the height adjusting mechanism (102) has a bar or track (120) and a carrier (140); wherein the web guide is secured to the carrier forming the subassembly.

5. A seat belt system (100) for protecting a passenger of a vehicle, the system comprising:
   a seat belt retractor (501), a height adjusting mechanism (102) and a web guide (104), the height adjusting mechanism and web guide form part of a subassembly (106) configured to be mounted together to a mounting surface;
   the height adjusting mechanism including a carrier with a generally planar front surface (146) and wherein the web guide (104) includes a body (162) having a mounting opening (170), the mounting opening (170) including opposing shoulders or first stops (184, 186) for limiting the rotation of the web guide, the carrier (140) including a fastener receiving structure, the system including a fastener (160, 160a) mountable to the fastener receiving structure, the web guide rotatable upon a portion of the fastener, one of the fastener or the fastener receiving structure including a mechanism stop (178) that interferes with the first stops (184, 186) to limit the rotation of the web guide.

6. A seat belt system (100) for protecting a passenger of a vehicle, the system comprising:
   a seat belt retractor (501), a height adjusting mechanism (102) and a web guide (104);
   the height adjusting mechanism includes a carrier with a front surface (146) and wherein the web guide (104) includes a body (162) having a mounting opening (170), the mounting opening (170) including opposing shoulders or first stops (184, 186) for limiting the rotation of the web guide, the carrier (140) including a fastener opening (154) adapted to receive a fastener (160, 160a), the web guide rotatable upon a portion of the fastener, the fastener including a mechanism stop (178) that interferes with the first stops (184, 186) to limit the rotation of the web guide.

7. The system according to claim 6 wherein the fastener opening is one of circular or keyed and wherein the fastener is one of a) a rivet secured to the carrier or b) a combination of a rivet, configured to received a bolt therein, secured to the carrier and wherein the bolt is secured to the rivet.

* * * * *